3,340,282
RECOVERING OILS FROM COMBUSTIBLE MATERIALS
Felix E. Taylor, 500 N. Newman St., Shattuck, Okla. 73858
No Drawing. Filed Mar. 22, 1965, Ser. No. 441,904
3 Claims. (Cl. 260—412)

ABSTRACT OF THE DISCLOSURE

Non-flavored cooking oils, vegetable fats, and waxy or resinous materials are obtained by controlled combustion of cellulosic plant matter.

---

This invention relates to a method of producing natural oils. In one aspect the invention relates to an improved method for recovering vegetable oils and fats from naturally occurring cellulosic materials by a controlled combustion. In another aspect, the invention relates to a method for recovering increased amounts of natural oils and fats from cellulosic raw materials beyond the amounts obtainable by current methods, the recovery being effected by combustion under controlled conditions of pressure, temperature and oxidizing agent.

Vegetable fats and oils are known to be contained in large amounts in the seeds and nuts of certain plant life, and in many commonly known instances these fats and oils are recovered as a product of commerce. As examples can be cited peanut butter, soya oil, corn oil, etc., and the various nut-flavored extract condiments. These materials are known to contain food values suitable for use by humans or other animals. Certain of these oils are also useful as lubricants and coolants. However, the amount of oils and fats that can be recovered by the presently known techniques, such as presssing, grinding, or solvent extraction, is severely limited and the products are relatively expensive because of their derivation from only the more desirable portion of the plant.

Accordingly, it is an object of this invention to provide a method for recovering increased amounts of oils and fats from cellulosic raw materials. It is another object of the invention to provide a method for recovering natural oils and fats from the less desirable portions of naturally occurring plant matter. It is still another object of this invention to provide a method for recovering natural oils and fats from a greater variety of species of plant matter than are now used as a source of such materials.

Other aspects, objects and the several advantages of this invention will become apparent upon further study of this disclosure and the appended claims.

According to the invention, there is provided a method for producing natural oils and fats which comprises burning plant matter in a closed combustion zone with oxygen-containing gas, passing combustion products from said burning to a condensing zone maintained at a temperature in the range of about 50 to about 180 degrees F. and a pressure in the range of about 0.5 to about 30 inches mercury gauge, removing gases from said condensing zone and returning same to said combustion zone, and continuously circulating combustion gas through the loop comprising said combustion zone and said condensing zone for a time sufficient to produce an oleaginous product in said condensing zone.

In my United States Patent No. 3,152,914, issued Oct. 13, 1964, with the title "Condensed Smoke Oil," I disclose and claim a method for producing a smoke-oil product, and the product thus obtained. The product of that patent is eminently suitable for imparting a smoked flavor to foods. During the course of my investigations which eventually led to the product and process claimed there, I discovered additionally that I was able to produce certain oily and solid products from naturally occurring plant matter, which products did not necessarily serve as a condiment and which in certain instances were not even edible, but which are useful for various other purposes. For example, in that patent I discuss at column 4, lines 7–22, certain of these products briefly. The apparatus disclosed in that patent is also suitable for practice of the method of the present invention. As discussed to a small degree in that patent, I have now discovered that natural plant matter which has heretofore not been considered as being a source of oils and waxes is, surprisingly, capable of being converted to oils, waxes and resins by combustion under controlled conditions.

Suitable raw material for my present invention includes all natural plant matter capable of supporting combustion, such as woody tree matter, shrubs, grain chaff, corn cobs, sawdust, and even dried sea-weed. Each natural species will, upon combustion, produce only a limited range of chemical product types, and although these products vary from one species to another, they are relatively consistent from different specimens within a given species. One great economic advantage of the present invention is that I am enabled to produce useful materials, including various oils, fats and waxes, from raw feed materials which have up to now been considered as waste. For example, there is presently little market for such materials as corn cob, scrap wood cuttings, sawdust or wheat chaff. Yet because of the simplicity of my process, small units capable of practicing my invention can readily be erected right at the site of such waste sources, can even be made portable by suitably mounting on a trailer, and can thus up-grade these wastes even on a seasonal basis.

In my U.S. Patent 3,152,914, I discuss the addition of a stabilizing oil as a desirable but not essential feature. In the present invention, such a stabilizing oil is also not essential, and the desirability of using such a stabilizer will depend upon the end use of the product. The products of the present invention are admittedly crude in nature, in the same sense that crude petroleum oil is a complex mixture of many different chemical compounds. However, like crude petroleum oil, my products can be further refined and separated to less complex mixtures or even to relatively pure individual compounds if desired. It can accordingly be seen that the addition of an extraneous oil will depend upon the nature of the products desired.

As previously stated, the nature of my products will depend upon the species of plant matter being treated and also upon the conditions of combustion and condensation. I have found that natural oils and waxy resins can be produced over a temperature range of about 50 to about 180 degrees F. in the condensing zone, a pressure range of about ½ and preferably about 1 to about 30 inches of mercury gauge in the condensing zone, and sufficient oxidizing agent addition such as air to obtain from a barely smoldering to a flaming combustion in the combustion zone. The effect of these variables will be discussed in the following examples.

Example 1

Wood logs were burned with flaming combustion, while the temperature and pressure in the condensing zone were maintained at about 80 degrees F. and ½ inch mercury gauge, respectively. The apparatus was described in my U.S. Patent 3,152,914, and no stabilizing oil was used. There was recovered a two-phase product, the predominant phase of which (quantity-wise) proved on infra-red analysis to correspond very closely to cotton seed oil, with only traces of alcohol and aromatic impurities. The second phase was present in only a minor amount, and had a tarry or resinous appearance, but was insoluble in those solvents which readily dissolve wood tar. This fraction was also insoluble in the solvents used by the analytical laboratory employed for partition chromatography, and accordingly was not analyzed.

*Example 2*

Wood is burned in a manner similar to Example 1, except that the temperature in the condenser is raised to about 180 degrees F. The heavy oil which is formed can be separated by fractionation to provide a waxy residue.

As temperature in the condensing zone is decreased to the minimum of about 50 degrees F., the heavier insoluble phase increases in proportion relative to the oily phase, until at this low temperature there is produced also an aqueous phase which apparently contains light water soluble oils and acids, since it has a pungent odor and a sour taste. Decreasing the amount of oxidizing agent available so as to obtain a smoldering combustion appears to produce a less unsaturated product. An increase in pressure also forms a more predominant portion of the lighter oils, and this effect is emphasized by also raising the condenser temperature and limiting the amount of oxiding agent. These lighter oils are useful, for example, as paint thinners and dryers. I have been able to produce materials which, on analysis, prove to be ester mixtures which greatly resemble natural vegetable fats. On analysis, the fatty ester products prove to be derived from a mixture of saturated and unsaturated acids containing from about 5 to about 20 carbons per acid radical.

*Example 3*

A product very similar to that of Example 1 can be produced under a higher temperature of about 150 degrees F. and pressure of about 1 inch mercury gauge in the condensing zone. These conditions can be achieved, for example, by increasing the blower velocity and slightly decreasing the amount of choking in the condenser. The higher carbon radicals, e.g. about 12 to 18 carbons, seem to be increased in the product under these conditions.

I note as a matter of interest that water formed by combustion is typically recovered from the ash pit of the device illustrated in my United States Patent No. 3,152,914.

Reasonable variation and modification are possible within the scope of this disclosure and the appended claims.

I claim:

1. A method for producing oils which comprises burning plant matter in a closed combustion zone with oxygen-containing gas, passing combustion products from said burning to a condensing zone maintained at a temperature in the range of about 50 to about 180 degrees F. and a pressure in the range of about 0.5 to about 30 inches mercury gauge, removing gases from said condensing zone and returning same to said combustion zone, and continuously circulating combustion gas through the loop comprising said combustion zone and said condensing zone for a time sufficient to produce an oleaginous product in said condensing zone.

2. The method of claim 1 wherein the plant matter comprises wood, and wherein there is supplied sufficient air to support flaming combustion.

3. The method of claim 2 wherein temperature and pressure in said condensing zone are maintained at about 80 degrees F. and about ½ inch mercury gauge respectively.

References Cited

UNITED STATES PATENTS 3,152,914  10/1964  Taylor _____ 99—140

HENRY R. JILES, *Primary Examiner.*

R. BOYD, A. M. TIGHE, *Assistant Examiners.*